R. KUESS.
CORN PLANTER.
APPLICATION FILED JULY 17, 1916.
1,213,112. Patented Jan. 16, 1917.
2 SHEETS—SHEET 2.
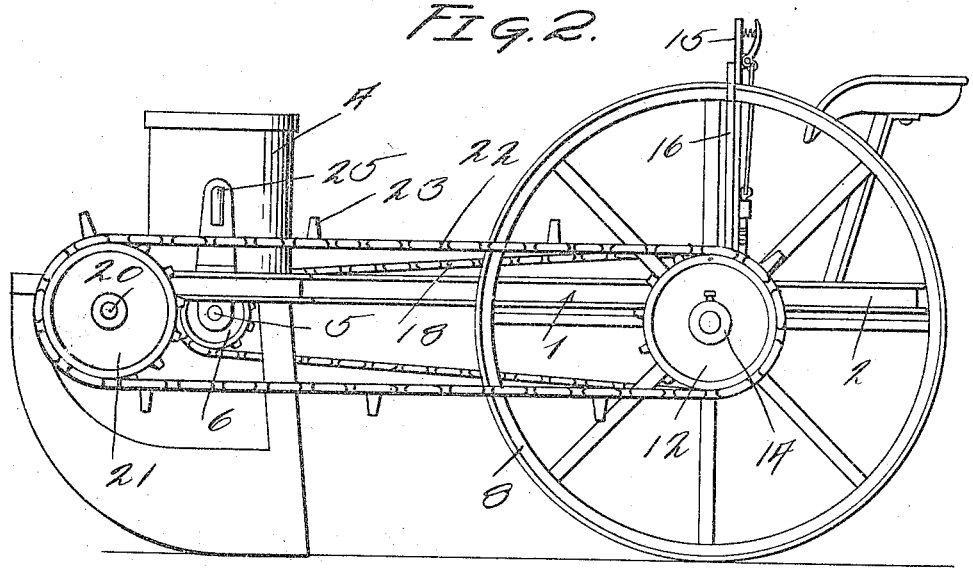
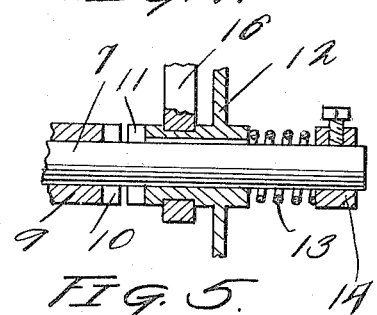
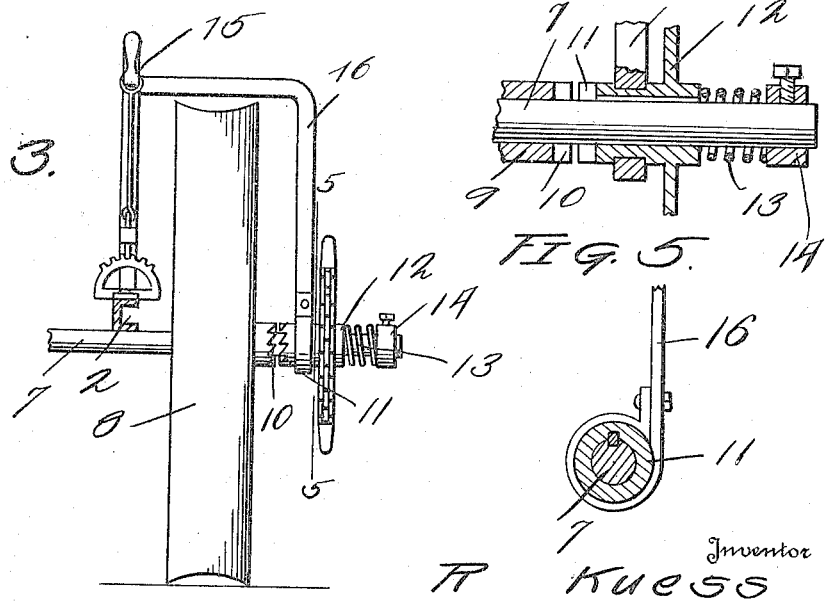

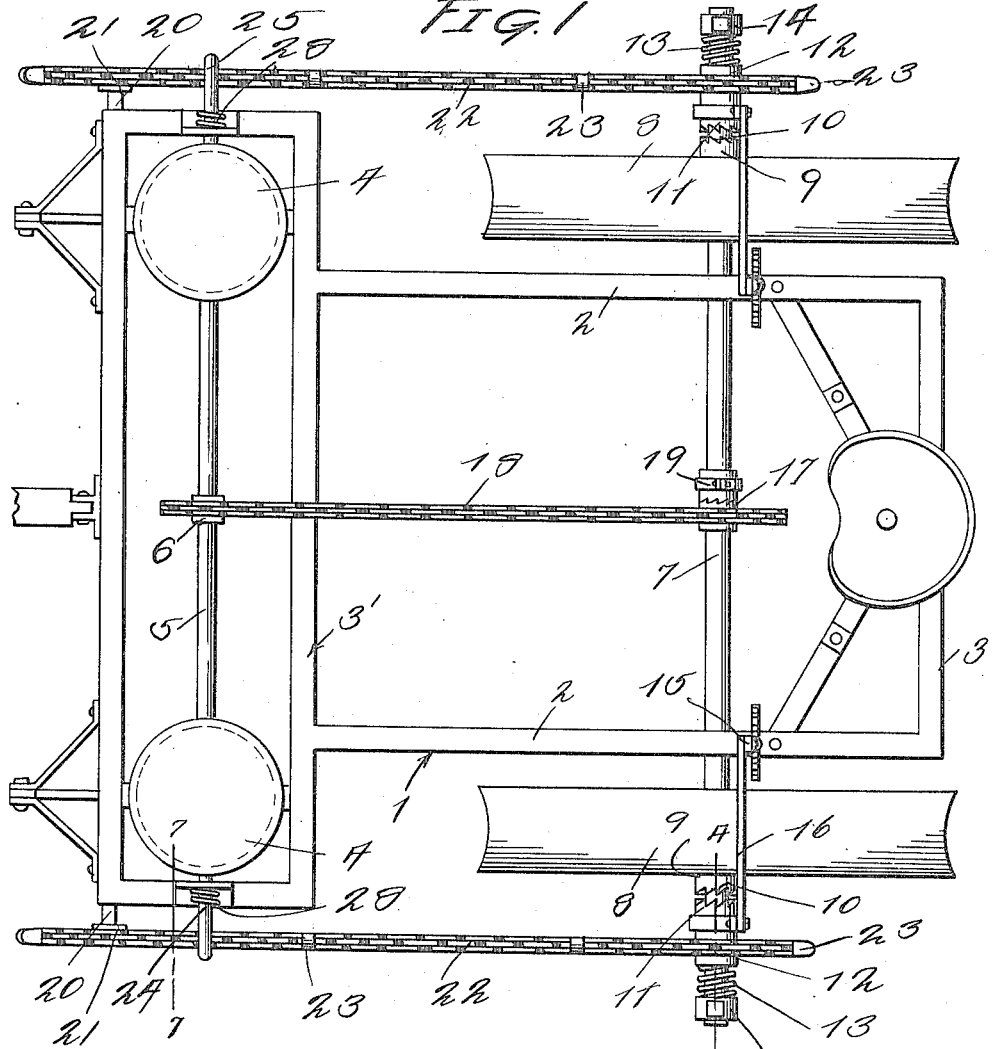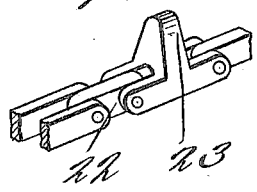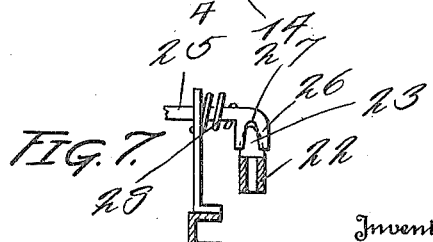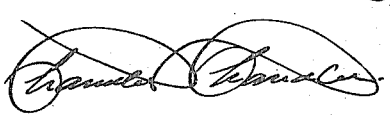

UNITED STATES PATENT OFFICE.

ROMAN KUESS, OF CHICKASAW, OHIO.

CORN-PLANTER.

1,213,112.  Specification of Letters Patent.  Patented Jan. 16, 1917.

Application filed July 17, 1916. Serial No. 109,748.

*To all whom it may concern:*

Be it known that I, ROMAN KUESS, a citizen of the United States, residing at Chickasaw, in the county of Mercer, State of Ohio, have invented certain new and useful Improvements in Corn-Planters; and I do hereby declare the following to be a full, clear, and exact description of the invention, such as will enable others skilled in the art to which it appertains to make and use the same.

The present invention is directed to improvements in corn planters, and has for its object to provide a device of this character so constructed that the seed can be dropped at predetermined intervals as the machine travels over the field.

A further object of the invention is to provide a corn planter having novel means for actuating shafts which control the seed regulating or dropping plate.

A still further object of the invention is to provide a corn planter so constructed that the discharge of seed from the hoppers can be controlled independently so that should it be desired to plant one row at a time it can be done.

With these and other objects in view, this invention resides in the novel features of construction, formation, combination and arrangement of parts to be hereinafter more fully described, claimed and illustrated in the accompanying drawing, in which:—

Figure 1 is a top plan view of the device. Fig. 2 is a side elevation. Fig. 3 is a rear view of such mechanism. Fig. 4 is a sectional view on line 4—4 of Fig. 1. Fig. 5 is a similar view on line 5—5 of Fig. 3. Fig. 6 is a fragmentary view of the chain. Fig. 7 is a sectional view on line 7—7 of Fig. 1.

Referring to the drawing 1 indicates the frame, which consists of side bars 2 and a rear bar 3, the forward ends of the bars 2 being connected with the supplemental frame 3 which supports the hoppers 4, the agitators therein being controlled by the shaft 5, said shaft being provided with a sprocket wheel 6. Journaled in the side bars 2 is an axle 7, the wheels 8 carried thereby having their hubs 9 provided with clutch sleeves 10 which are adapted to engage the clutch sleeves 11 carried by the extended ends of the axle, said sleeves having fixed thereto sprocket wheels 12. The sleeves 11 are urged toward the sleeves 10 by coil springs 13, said springs being retained on the axle by adjusted collars 14.

End levers 15 are supported by the side bars 2 of the frame 1 and are connected to the sleeves 11 by arms 16, whereby the clutch mechanism can be thrown in or out, as desired.

Fixed to the axle 2 is a sprocket wheel 17, and turned around this sprocket and the sprocket 6 is a sprocket chain 18 which transmits movement from the axle 7 to the shaft 5 when the machine is in motion, suitable clutch mechanisms 19 being mounted on the axle 7 so that the movement of the chain 18 can be controlled.

Stubs shafts 20 are supported by the supplemental frame 3 and have engaged thereon sprocket wheels 21, said wheels being alined with the sprocket wheels 9, and trained around these wheels are sprocket chains 22, certain links of said chain being provided with tappets 23, the purpose of which appears later.

The hoppers have mounted therein the usual feed plates, and associated with these plates are shafts 24 and 25, the outer ends of which are provided with spaced fingers 26 which span the chains 22, and are in the line of travel of the tappets 23 so that when the shafts are engaged by a tappet the shafts will be rocked, thus moving the feed plate so as to discharge the grain at predetermined intervals. That portion of the shafts between the fingers 26 is provided with webs 27 so that when engaged with the tappet the respective shafts will be rocked. The shafts 24 and 25 are connected to the end bars of the frame by coil springs 28, said springs serving to return the shafts to their operative position after being disengaged by the tappets.

What is claimed is:—

1. A seed planter comprising a frame, a wheeled axle supporting the frame, a supplemental frame, hoppers supported by the supplemental frame, shafts associated with the hoppers for controlling the movement of the feed plates of the hoppers, said shafts having fingers carried by their outer ends, webs disposed between the fingers, sprocket wheels associated with the supplemental frame, sprocket wheels carried by the axle, chains connecting the said sprocket wheels and having tappets carried thereby said chains being engaged between the fingers, said tappets being adapted to engage the webs to rock the shafts, and means for returning the shafts to their normal position after being rocked.

2. A seed planter comprising a frame, a wheeled axle supporting the frame, a supplemental frame, hoppers supported by the supplemental frame, shafts associated with the hoppers for controlling the movement of the feed plates of the hoppers, fingers carried by the shafts, webs disposed between the fingers, idler sprocket wheels supported by the supplemental frame, driving sprocket wheels carried by the axle, chains connecting said sprockets and having tappets carried thereby for engaging the webs to rock the shafts, means for returning the shafts to their normal positions after being rocked, and means for disconnecting either or both of the driving sprocket wheels, as and for the purpose set forth.

In testimony whereof, I affix my signature, in the presence of two witnesses.

ROMAN KUESS.

Witnesses:
 JOHN ROSE, Jr.,
 ALOYS STAMMEN.

Copies of this patent may be obtained for five cents each, by addressing the "Commissioner of Patents, Washington, D. C."